United States Patent
Su et al.

(10) Patent No.: US 11,438,069 B2
(45) Date of Patent: Sep. 6, 2022

(54) DATA TRANSMISSION METHOD AND APPARATUS

(71) Applicant: HUAWEI TECHNOLOGIES CO., LTD., Guangdong (CN)

(72) Inventors: Wei Su, Chengdu (CN); Qiuyou Wu, Dongguan (CN); Huaping Qing, Chengdu (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 17/103,180

(22) Filed: Nov. 24, 2020

(65) Prior Publication Data

US 2021/0083774 A1 Mar. 18, 2021

Related U.S. Application Data

(63) Continuation of application No. PCT/CN2018/088465, filed on May 25, 2018.

(51) Int. Cl.
| | |
|---|---|
| *H04B 10/27* | (2013.01) |
| *H04L 1/00* | (2006.01) |
| *H04B 10/69* | (2013.01) |
| *H04J 3/16* | (2006.01) |

(52) U.S. Cl.
CPC ......... *H04B 10/27* (2013.01); *H04B 10/6932* (2013.01); *H04J 3/1658* (2013.01); *H04L 1/0002* (2013.01); *H04L 1/0025* (2013.01); *H04L 1/0046* (2013.01)

(58) Field of Classification Search
CPC ... H04B 10/27; H04B 10/6932; H04J 3/1658; H04L 1/0002; H04L 1/0025
USPC .......................................................... 398/58
See application file for complete search history.

(56) References Cited

U.S. PATENT DOCUMENTS

| | | | | |
|---|---|---|---|---|
| 2004/0199659 A1* | 10/2004 | Ishikawa | ................. | H04L 47/10 709/235 |
| 2010/0061725 A1* | 3/2010 | Jiang | ..................... | H04J 3/1658 398/45 |
| 2013/0108268 A1* | 5/2013 | Valiveti | ................. | H04J 3/1652 398/58 |
| 2015/0181316 A1* | 6/2015 | Patel | .................. | H04Q 11/0062 398/45 |

(Continued)

FOREIGN PATENT DOCUMENTS

| | | |
|---|---|---|
| CN | 1984018 A | 6/2007 |
| CN | 102195864 A | 9/2011 |
| CN | 102893629 A | 1/2013 |

(Continued)

OTHER PUBLICATIONS

OTN Interface Standards for Rates Beyond 100 GB/s, Journal of Lightwave Technology, vol. 36, No. 1, Jan. 1, 2018, Gorshe (Year: 2018).*
Extended European Search Report in European Application No. 18919805.4 dated Apr. 6, 2021, 7 pages.
Office Action issued in Chinese Application No. 201880092792.6 dated May 7, 2021, 19 pages (with English translation).

(Continued)

*Primary Examiner* — Ted M Wang
(74) *Attorney, Agent, or Firm* — Fish & Richardson P.C.

(57) ABSTRACT

This application provides data transmission methods and apparatuses. One method includes: processing, by a network device, a first optical data unit (ODU) to obtain a second ODU, wherein a bit rate of the second ODU is lower than a bit rate of the first ODU; and sending, by the network device, the second ODU.

18 Claims, 10 Drawing Sheets

(56) References Cited

U.S. PATENT DOCUMENTS

2017/0093757 A1 3/2017 Gareau et al.

FOREIGN PATENT DOCUMENTS

| | | |
|---|---|---|
| CN | 103947141 A | 7/2014 |
| CN | 104066017 A | 9/2014 |
| CN | 106411454 A | 2/2017 |
| CN | 106712893 A | 5/2017 |
| CN | 104737501 B | 11/2017 |
| CN | 107566925 A | 1/2018 |
| CN | 107968699 A | 4/2018 |
| EP | 3687088 A1 | 7/2020 |
| WO | 2009006835 A1 | 1/2009 |
| WO | 2011035603 A1 | 3/2011 |
| WO | 2014015918 A1 | 1/2014 |
| WO | 2016074484 A1 | 5/2016 |

OTHER PUBLICATIONS

PCT International Search Report and Written Opinion issued in International Application No. PCT/CN2018/088465 dated Mar. 1, 2019, 19 pages (with English translation).

Office Action issued in Chinese Application No. 201880092792.6 dated Oct. 19, 2021, 7 pages.

Peiyi, "Theories and Applications of Digital Media Asset Management," Chapter 2: Storage Technology for Digital Media Asset Management, China Radio and Television Press, Feb. 1, 2013, 5 pages (with English translation).

Xiaohu, "Computer Multimedia Technology," Chapter 6: Compression Multimedia Data, China Railway Press, May 1, 2018, 5 pages (with English translation).

EPO Communication pursuant to Article 94(3) EPC issued in European Application No. 18919805.4 dated Feb. 23, 2022, 6 pages.

Office Action issued in Chinese Application No. 201880092792.6 dated Jun. 20, 2022, 4 pages.

* cited by examiner

DATA TRANSMISSION METHOD AND APPARATUS

CROSS-REFERENCE TO RELATED APPLICATIONS

This application is a continuation of International Patent Application No. PCT/CN2018/088465, filed on May 25, 2018. The disclosure of the aforementioned application is hereby incorporated by reference in its entirety.

TECHNICAL FIELD

This application relates to the field of optical transport networks, and more specifically, to a data transmission technology.

BACKGROUND

Optical networks are a type of transport networks that can implement transmission, multiplexing, route selection, and monitoring of service signals, such as an optical transport network (OTN). As a core of a next generation transport network, the OTN includes electrical and optical layers, and has an operation administration and maintenance (OAM) function, a tandem connection monitoring (TTCM) capability, and a forward error correction (FEC) capability, and this helps flexibly schedule and manage large-capacity services. For this reason, more overhead information needs to be provided for an OTN data frame. This results in a large increase in a rate of the OTN data frames relative to a rate of service data, and increases OTN costs.

Therefore, a new data transmission technology is urgently needed to reduce the rate increase caused by transmitting data in the OTN, so as to reduce costs.

SUMMARY

This application provides a data transmission method and apparatus to reduce a bit rate of an OD and help reduce costs of an optical network.

According to a first aspect, a data transmission method is provided and includes: processing, by a network device, a to-be-sent first optical data unit ODU to obtain a second ODU, where a bit rate of the second ODU is lower than a bit rate of the first ODU; and sending, by the network device, the second ODU.

In this embodiment of this application, the first ODU is processed to obtain the second ODU with a lower bit rate, and this helps reduce a rate increase when service data is transmitted in an OTN, so as to reduce an OTN interface rate and OTN costs.

In a possible implementation, a frame structure of the first ODU is different from a frame structure of the second ODU, or an encoding mode of the first ODU is different from an encoding mode of the second ODU.

In this embodiment of this application, a frame structure is changed or an encoding mode of an ODU is changed to reduce the bit rate of the second ODU, and this helps reduce a rate increase when service data is transmitted in an OTN.

In a possible implementation, the processing, by a network device, a to-be-sent first optical data unit ODU to obtain a second ODU includes: performing, by the network device, compression encoding on the first ODU to obtain the second ODU.

In this embodiment of this application, compression encoding is performed on the first ODU to reduce the bit rate of the second ODU, and this helps reduce a rate increase when service data is transmitted in an OTN.

In a possible implementation, the performing, by the network device, compression encoding on the first ODU to obtain the second ODU includes: performing, by the network device, first compression encoding on data in a payload area of the first ODU to obtain the second ODU.

In a possible implementation, the performing, by the network device, compression encoding on the first ODU to obtain the second ODU includes: performing, by the network device, second compression encoding on an overhead in the first ODU to obtain the second ODU.

In a possible implementation, the processing, by a network device, a to-be-sent first optical data unit ODU to obtain a second ODU includes: deleting, by the network device, at least a part of fixed stuff information in the first ODU to obtain the second ODU.

In this embodiment of this application, at least the part of fixed stuff information in the first ODU is deleted to reduce the bit rate of the second ODU, and this helps reduce a rate increase when service data is transmitted in an OTN. Optionally, the fixed stuff information is an idle code block.

In a possible implementation, the method further includes: obtaining, by the network device, a mapping pattern of a payload area of the first ODU; and the deleting, by the network device, at least a part of fixed stuff information in the first ODU to obtain the second ODU includes: deleting, by the network device, at least the part of fixed stuff information in the first ODU based on the mapping pattern of the payload area of the first ODU.

In a possible implementation, the processing, by a network device, a to-be-sent first optical data unit ODU to obtain a second ODU includes: deleting, by the network device, an unused timeslot in the first ODU to obtain the second ODU.

In this embodiment of this application, the unused timeslot in the first ODU is deleted to reduce the bit rate of the second ODU, and this helps reduce a rate increase when service data is transmitted in an OTN.

In a possible implementation, the sending, by the network device, the second ODU includes: mapping, by the network device, the second. ODU to a third ODU, where a bit rate of the third ODU is any one of n×25 G, n×50 G, and n×100 G, and n is a positive integer; and sending, by the network device, the third ODU through m FlexO interfaces, where m is a positive integer, and a bit rate of each FlexO interface is any one of 25 G, 50 G, 100 G, 200 G, or 400 G.

In this embodiment of this application, different bit rates are configured for the FlexO interface and the third ODU, so that a transmission service may be provided for a plurality of types of service data at different bit rates.

In a possible implementation, the sending, by the network device, the second ODU includes: directly mapping, by the network device, the second ODU to a FlexO frame. To be specific, the network device directly maps the second ODU to m FlexO interfaces and sends the second ODU through the FlexO interfaces.

In this embodiment of this application, the second ODU is directly mapped to the FlexO interfaces, so that a bit rate increase caused by adding an overhead of an OTU when an ODU is encapsulated into the OTU is avoided, and this helps reduce a rate increase when service data is transmitted in an OTN.

In a possible implementation, a bit rate of each of the m FlexO interfaces through which the FlexO frame is transmitted is 25 G, 50 G, 100 G, 200 G, or 400 G, and m is a positive integer.

In this embodiment of this application, different bit rates are configured for the FlexO interface, so that a transmission service may be provided for a plurality of types of service data at different bit rates.

In a possible implementation, the method further includes: determining, by the network device based on a service type to which data carried in the first ODU belongs, a maximum data volume of data carried in the second ODU; and the processing, by a network device, a to-be-sent first optical data unit ODU to obtain a second ODU includes: processing, by the network device, the first ODU to obtain the second ODU, where a data volume of the data carried in the second ODU is the maximum data volume.

In this embodiment of this application, the maximum data volume of the data carried in the second ODU is defined, so that a frame size of the second ODU is fixed, and the network device can determine a frame.

According to a second aspect, a data transmission method is provided and includes: obtaining, by a network device, a to-be-sent second optical data unit ODU; and directly sending, by the network device, the second ODU through a FlexO interface.

In this embodiment of this application, the second ODU is directly sent through the FlexO interface, so that a bit rate increase caused by adding an overhead of an OTU when an ODU is encapsulated into the OTU is avoided, and this helps reduce a rate increase when service data is transmitted in an OTN.

In a possible implementation, the obtaining, by a network device, a to-be-sent second ODU includes: obtaining, by the network device, a first ODU; and processing, by the network device, the first ODU to obtain the second ODU, where a bit rate of the second ODU is lower than a bit rate of the first ODU.

In this embodiment of this application, the first ODU is processed to obtain the second ODU with a lower bit rate, and this helps reduce a rate increase when service data is transmitted in an OTN, so as to reduce an OTN interface rate and OTN costs.

In a possible implementation, a frame structure of the first ODU is different from a frame structure of the second ODU, or an encoding mode of the first ODU is different from an encoding mode of the second ODU.

In this embodiment of this application, a frame structure is changed or an encoding mode of an ODU is changed to reduce the bit rate of the second ODU, and this helps reduce a rate increase when service data is transmitted in an OTN.

In a possible implementation, the processing, by a network device, a to-be-sent first ODU to obtain a second ODU includes: performing, by the network device, compression encoding on the first ODU to obtain the second ODU.

In this embodiment of this application, compression encoding is performed on the first ODU to reduce the bit rate of the second ODU, and this helps reduce a rate increase when service data is transmitted in an OTN.

In a possible implementation, the processing, by a network device, a first ODU to obtain a second ODU includes: deleting, by the network device, at least a part of fixed stuff information in the first ODU to obtain the second ODU.

In this embodiment of this application, at least the part of fixed stuff information in the first ODU is deleted to reduce the bit rate of the second ODU, and this helps reduce a rate increase when service data is transmitted in an OTN.

In a possible implementation, the method further includes: obtaining, by the network device, a mapping pattern of a payload area of the first ODU; and the deleting, by the network device, at least a part of fixed stuff information in the first ODU to obtain the second ODU includes: deleting, by the network device, at least the part of fixed stuff information in the first ODU based on the mapping pattern of the payload area of the first ODU.

In a possible implementation, the processing, by a network device, a to-be-sent first optical data unit ODU to obtain a second ODU includes: deleting, by the network device, an unused timeslot in the first ODU to obtain the second ODU.

In this embodiment of this application, the unused timeslot in the first ODU is deleted to reduce the bit rate of the second ODU, and this helps reduce a rate increase when service data is transmitted in an OTN.

According to a third aspect, a data transmission method is provided and includes: receiving, by a network device, a second optical data unit ODU; processing, by the network device, the second ODU to obtain a first ODU, where a bit rate of the second ODU is lower than a bit rate of the first ODU; and obtaining, by the network device, data from the first ODU.

In this embodiment of this application, the second ODU with a lower bit rate than that of the first ODU is used to carry data, and this helps reduce a rate increase when service data is transmitted in an OTN, so as to reduce an OTN interface rate and OTN costs.

In a possible implementation, a frame structure of the first ODU is different from a frame structure of the second ODU, or an encoding mode of the first ODU is different from an encoding mode of the second ODU.

In this embodiment of this application, a frame structure is changed or an encoding mode of an ODU is changed to reduce the bit rate of the second ODU, and this helps reduce a rate increase when service data is transmitted in an OTN.

In a possible implementation, the processing, by the network device, the second ODU to obtain a first ODU includes: decoding, by the network device, the second ODU to obtain the first ODU.

In a possible implementation, the decoding, by the network device, the second ODU to obtain the first ODU includes: performing, by the network device, first decoding on data in a payload area of the second ODU to obtain the first ODU.

In a possible implementation, the decoding, by the network device, the second ODU to obtain the first ODU includes: performing, by the network device, second decoding on an overhead in the second ODU to obtain the first ODU.

In a possible implementation, the decoding, by the network device, the second ODU to obtain the first ODU includes: filling, by the network device, the second ODU with fixed stuff information to obtain the first ODU.

In a possible implementation, the processing, by the network device, the second ODU to obtain a first ODU includes: filling, by the network device, the second ODU with a timeslot to obtain the first ODU.

In a possible implementation, the method further includes: determining, by the network device, a service type to which data carried in the second ODU belongs; and determining, by the network device, a frame size of the second ODU based on the service type to which the data belongs.

According to a fourth aspect, a network device is provided, and the network device includes required modules configured to perform the steps performed by the network device in the foregoing methods. These modules may be implemented by hardware, or may be implemented by hardware by executing corresponding software. The hardware or the software includes one or more units corresponding to the foregoing functions.

According to a fifth aspect, a data transmission apparatus is provided. The apparatus may be the network device in the foregoing method designs or may be a chip that is disposed in the network device. The apparatus includes: a memory, a communications interface, and a processor. The memory is configured to store computer executable program code. The processor is coupled to the memory and the communications interface. The program code stored in the memory includes an instruction, and when the processor executes the instruction, the apparatus performs the method performed by the network device in the foregoing methods.

According to a sixth aspect, a network device is provided and includes: a processor and a memory. The memory is configured to store computer program, and the processor is configured to invoke the computer program from the memory and run the computer program, so that the network device performs the foregoing methods.

According to a seventh aspect, a computer program product is provided, and the computer program product includes computer program code. When the computer program code runs on a computer, the computer performs the methods in the foregoing aspects.

It should be noted that all or a part of the foregoing computer program code may be stored on a first storage medium. The first storage medium may be encapsulated together with a processor, or may be encapsulated separately from a processor. This is not specifically limited in the embodiments of this application.

According to an eighth aspect, a computer readable medium is provided, and the computer readable medium stores program code. When the computer program code runs on a computer, the computer performs the methods in the foregoing aspects.

In the embodiments of this application, the first ODU is processed to obtain the second ODU with a lower bit rate, and this helps reduce a rate increase when service data is transmitted in an OTN, so as to reduce an OTN interface rate and OTN costs.

In addition, a rate increase brought by the data transmission technology provided in the embodiments of this application is comparable to a rate increase brought by the Ethernet technology, with an advantage that an OTN device using the technology can use a same optical module as that used by an Ethernet device, so that the same optical module is configured for different devices, and this helps reduce costs of the optical module and further reduce costs of the OTN device.

DESCRIPTION OF EMBODIMENTS

Figures 1, 2:
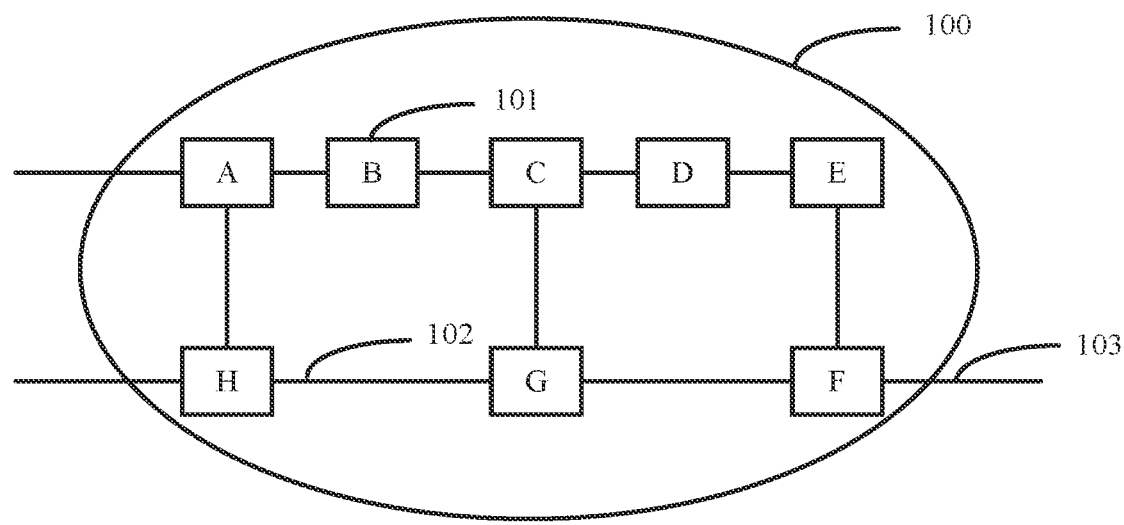
FIG. 1 is a schematic block diagram of an architecture of an optical network.
FIG. 2 is a schematic diagram of an OTU frame structure.

For ease of understanding, a communications system to which an embodiment of this application is applicable is briefly described first with reference to FIG. 1. FIG. 1 is a schematic block diagram of an architecture of an optical network.

The optical network shown in FIG. 1 may be an OTN. An OTN is usually formed by connecting a plurality of OTN devices by using an optical fiber, and may have different topological types such as a line type, a ring type, and a mesh type based on a specific requirement. An OTN 100 shown in FIG. 1 includes: eight OTN devices 101 (devices A to H), an optical fiber 102 configured to connect two OTN devices, and a customer service interface 103 configured to receive or send customer service data. For example, to-be-transmitted customer service data may be transmitted, through the customer service interface 103, from the OTN device F to the OTN device H via the OTN device G. In this case, the OTN device F may be a source end for transmitting the service data, the OTN device G may be an intermediate node for transmitting the service data, and the OTN device H may be a destination end for transmitting the service data. According to actual requirements, an OTN device may have different functions. Generally, the OTN device is classified into an optical layer device, an electrical layer device, and an optoelectronic hybrid device.

The optical layer device is a device that can process an optical layer signal, for example, an optical amplifier (OA) or an optical add/drop multiplexer (OADM). The OA may also be referred to as an optical line amplifier (OLA), and is mainly used to amplify an optical signal, so as to support transmission over a longer distance without compromising specific performance of the optical signal. The OADM is configured to perform space conversion on an optical signal, so that the optical signal can be output from different output ports (which are sometimes referred to as directions). According to different capabilities, the OADM may be classified into a fixed OADM (FOADM), a reconfigurable OADM (ROADM), and the like. The electrical layer device is a device that can process an electrical layer signal, for example, a device that can process an OTN signal. The optoelectronic hybrid device is a device capable of processing an optical layer signal and an electrical signal. It should be noted that, according to a specific integration requirement, one OTN device may aggregate a plurality of different functions. The technical solutions provided in this application are applicable to OTN devices of different forms and integrations.

When customer service data is transmitted in an OTN, the service data may be encapsulated in an OTN frame for transmission. The OTN frame may be an optical data unit (ODU) k frame, an ODUCn frame, an ODUflex frame, an optical transport unit (Optical Transport Unit, OTU) k frame, an OTUCn frame, a flexible OTN (FlexO) frame, or the like. FIG. 2 is a schematic diagram of an OTU frame structure. An OTN frame has a 4×4080 (4 rows and 4080 columns) modular structure. The OTN frame carries a frame alignment signal (FAS), an OTUk overhead (OH), an ODUk OH, an OPUk OH, an OPUk, and FEC. The FAS is configured to provide a frame alignment and positioning function, a length is 6 bytes, and is located in the first row and the first to the sixth columns of the OTU frame. The OTUk OH is used to provide a network management function of an optical transport unit level, and is located in the first row and the eighth to the fourteenth columns of the OTU frame. The ODUk OH is used to provide maintenance and operation functions, and is located in the second to the fourth rows and the first to the fourteenth columns of the OTU frame. The optical payload unit (OPU) k OH is used to provide a function of adapting a client signal, and is located in the first to the fourth rows and the fifteenth to the sixteenth columns of the OTU frame. The OPUk is configured to provide a function of carrying a client signal, and is located in the first to the fourth rows and the $17^{th}$ to the $3824^{th}$ columns of the OTU frame. The FEC is used to provide an error detection and correction function, and is located in the first to the fourth rows and the $3825^{th}$ to $4080^{th}$ columns of the OTU frame.

From the OTU frame structure shown in FIG. 2, it can be learned that the OTU frame includes an ODU frame and an OTU overhead, and the ODU frame includes an OPU and an ODU overhead. A coefficient k in the foregoing OPUk, ODUk, and OTUk indicates different bit rate levels. For example, k=0 indicates a bit rate of 1.25 Gbit/s, k=1 indicates a bit rate of 2.5 Gbit/s, k=2 indicates a bit rate of 10 Gbit/s, k=3 indicates a bit rate of 40 Gbit/s, k=4 indicates a bit rate of 100 Gbit/s, k=Cn indicates a bit rate of n×100 Gbit/s, and k=flex indicates a bit rate of n×1.25 Gbit/s (n≥2). In addition, FIG. 2 shows only a structure of a possible OTU frame. In different cases, the structure of the OTU frame may change. For example, when k=0 and k=flex, only OPU0, ODU0, OPUflex. and ODUflex are available. For OTUCn, the OTU frame includes n OTUC frames, and the OTU frame structure does not include an FEC area.

Unless otherwise specified, the ODU frame (also referred to as an ODU) in this application and a first ODU and a second ODU in the following may be specifically any one of an ODUk, an ODUCn, or an ODUflex. The OTU frame (also referred to as an OTU) in this application is any one of an OTUk, an OTUCn, or a FlexO.

Figure 3:
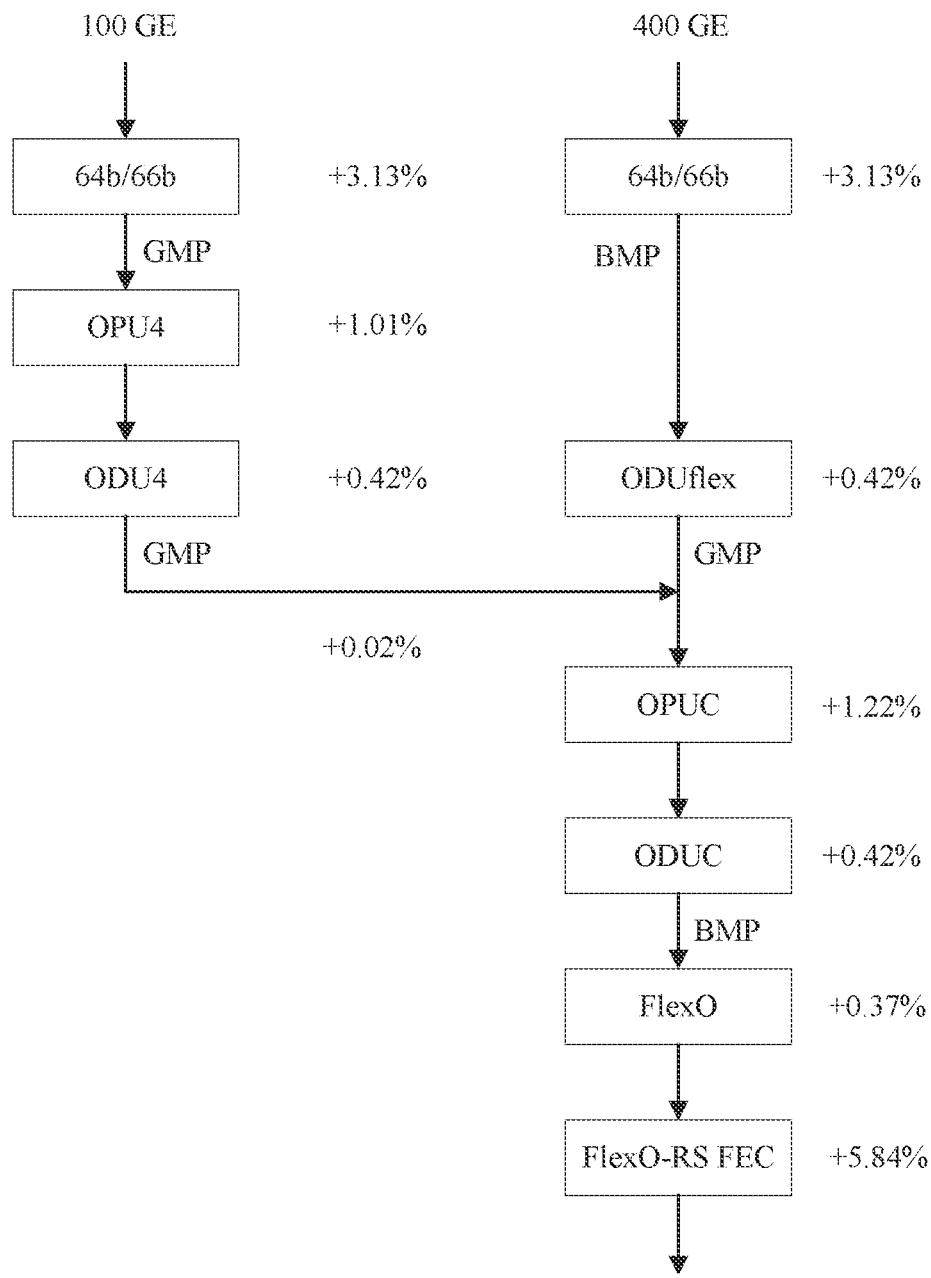
FIG. 3 is a schematic flowchart of a process of transmitting service data.

When service data at a same rate is transmitted by using a conventional OTN and the Ethernet, an interface rate at which the data is transmitted in the OTN usually increases relative to a rate of a same rate interface through which the data is transmitted in the Ethernet. To be specific, when service data is transmitted at a same rate, a data volume that needs to be transmitted in the OTN is greater than a data volume that needs to be transmitted in the Ethernet in unit time. FIG. 3 is a schematic flowchart of a process of transmitting service data. FIG. 3 shows an example of a processing procedure for transmitting 100 Gbit/s service data and 400 Gbit/s service data.

In a process of transmitting 100 Gbit/s Ethernet (Gbit/s Ethernet, 100 GE) service data, the service data is encoded in a 64 b/66 b encoding mode to generate a 66-bit code block data stream, and this causes a rate increase of 3.13%. When the 66-bit code block data stream is mapped to the OPU4, a rate increase of 1.01% may be caused. When the OPU4 is encapsulated into the ODU4, a rate increase of 0.42% is caused. When the ODU4 is mapped to the OPUCn, a rate increase of 0.02% is caused. When the OPUCn is encapsulated into the ODUCn, a rate increase of 0.42% is caused. When the ODUCn is mapped to the FlexO frame, a rate increase of 0.37% is caused. Finally, when FEC is added to the FlexO frame, a rate increase of 5.84% is caused.

In a process of transmitting 400 GE service data, the service data is encoded in a 64 b/66 b encoding mode to generate a 66-bit code block data stream, and this causes a rate increase of 3.13%. When the 66-bit code block data stream is mapped to the ODUflex, a rate increase of 0.42% may be caused. When the ODUflex is mapped to the OPUCn, a rate increase of 0.02% is caused. When the OPUCn is encapsulated into the ODUCn, a rate increase of 0.42% is caused. When the ODUCn is mapped to the FlexO frame, a rate increase of 0.37% is caused. Finally, when FEC is added to the FlexO frame, a rate increase of 5.84% is caused.

From the two processing examples in FIG. 3, it can be learned that the rate increases mainly due to two causes: an encoding mode and an encapsulation manner.

Cause 1: In an encoding mode, to-be-carried service data is transmitted in a form of a 66-bit code block data stream obtained by using 64 b/66 b encoding. In other words, every 64-bit data needs to be encoded into a 66-bit code block for transmission, and this causes a rate increase.

Cause 2: In an encapsulation manner, when the service data is transmitted in the OTN, multi-layer encapsulation needs to be performed on the service data, corresponding overheads are added in a process of encapsulating at each layer, and this causes a rate increase.

Figure 4:
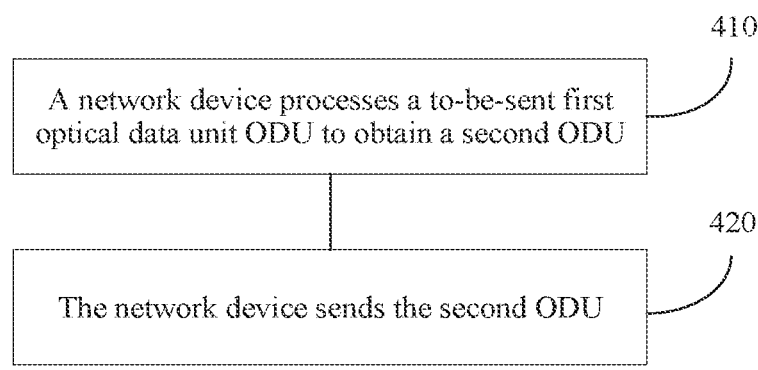
FIG. 4 is a schematic flowchart of a data transmission method according to an embodiment of this application.
Figure 5:
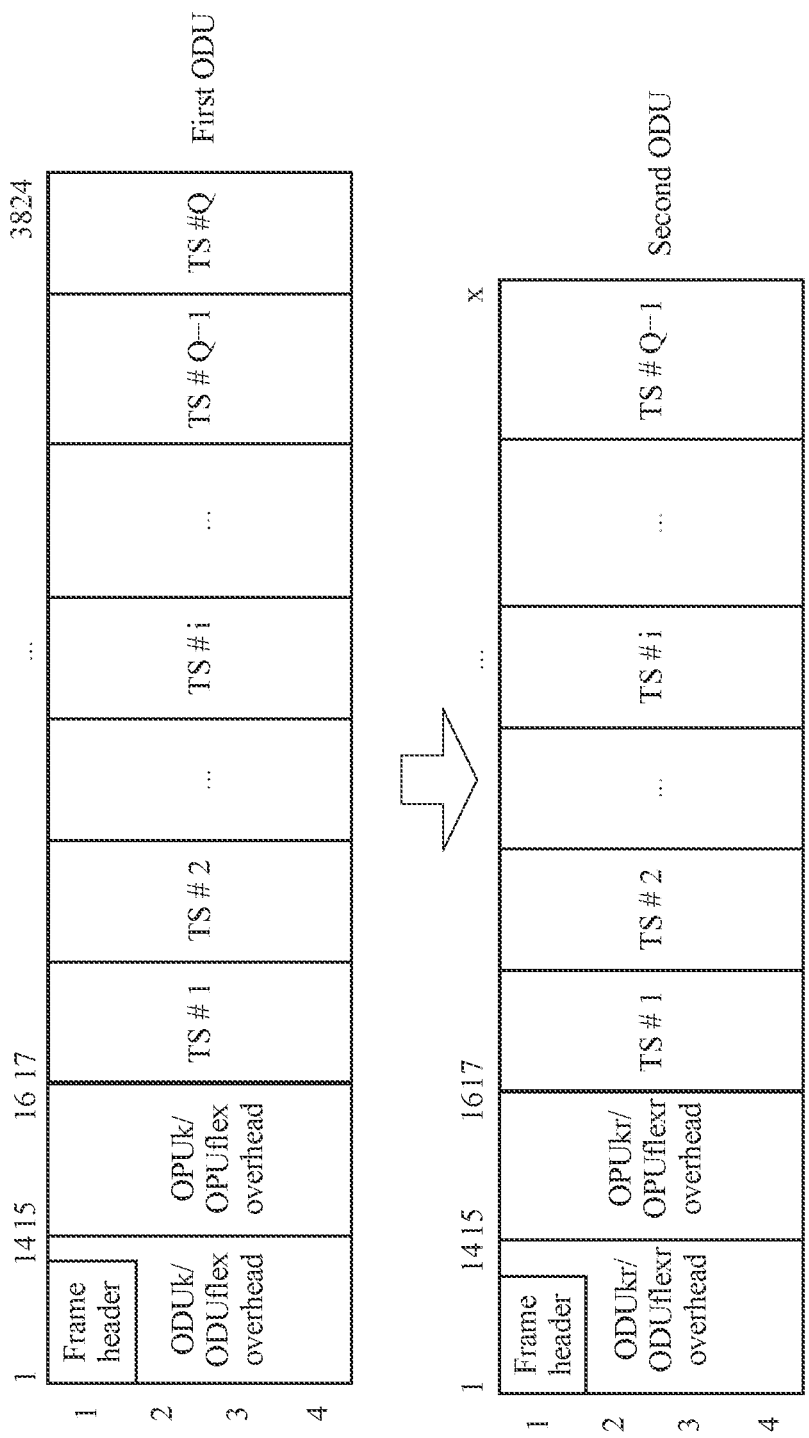
FIG. 5 is a schematic diagram of a frame structure of an ODU according to an embodiment of this application.

A rate increase when the service data is transmitted in the OTN causes an increase of OTN costs. Therefore, to reduce the rate increase when the service data is transmitted in the OTN, so as to reduce an OTN interface rate and the OTN costs, the embodiments of this application provide a data transmission method. The following describes in detail with reference to FIG. 4 to FIG. 6. With reference to FIG. 4, an encoding mode of an ODU is optimized to reduce a rate increase when service data is transmitted in an OTN. With reference to FIG. 5, a mapping manner of an ODU is optimized to reduce a rate increase when service data is transmitted in an OTN.

FIG. 4 is a schematic flowchart of a data transmission method according to an embodiment of this application. The method shown in FIG. 4 may be performed by a network device, and the network device may be any OTN device in FIG. 1 that sends data. Specifically, the network device may be a source node or an intermediate node.

410. The network device processes a to-be-sent first optical data unit ODU to obtain a second ODU, where a bit rate of the second ODU is lower than a bit rate of the first ODU.

The first ODU is processed to reduce the bit rate of the first ODU to generate the second ODU, so that a data volume carried by the second ODU is less than a data volume carried by the first ODU within same time. Therefore, the second ODU may be understood as an ODU obtained after the rate of the first ODU is reduced. When the first ODU is an ODUk, the second ODU may be represented by an ODUkr (ODUk reduction). When the first ODU is an ODUflex, the second ODU may be represented by an ODUflexr.

The foregoing processing may include: performing compression encoding on the first ODU, deleting fixed stuff information in the first ODU, deleting an idle timeslot in the first ODU, and the like. An implementation form of processing is not limited in this embodiment of this application.

After the processing, a frame structure of the first ODU may be different from a frame structure of the second ODU. For example, the frame structure of the first ODU is a frame structure of the ODU in FIG. 2. In the frame structure of the second ODU, a timeslot occupied by an OPUk/OPUflex used to carry service data is smaller than a timeslot occupied by a conventional OPUk/OPUflex. FIG. 5 is a schematic diagram of a frame structure of an ODU according to an embodiment of this application. In the frame structure of the ODU shown in FIG. 5, the frame structure of the first ODU includes a total of Q timeslots (Time Slot or Tributary Slot, TS): a timeslot #1, TS #2, ..., TS #i, ..., TS #(Q−1), and TS #Q, where Q is a positive integer. The frame structure of the second ODU includes a total of Q−1 timeslots: TS #1, TS #2, ... TS #i, ..., and TS #(Q−1).

Figure 6:
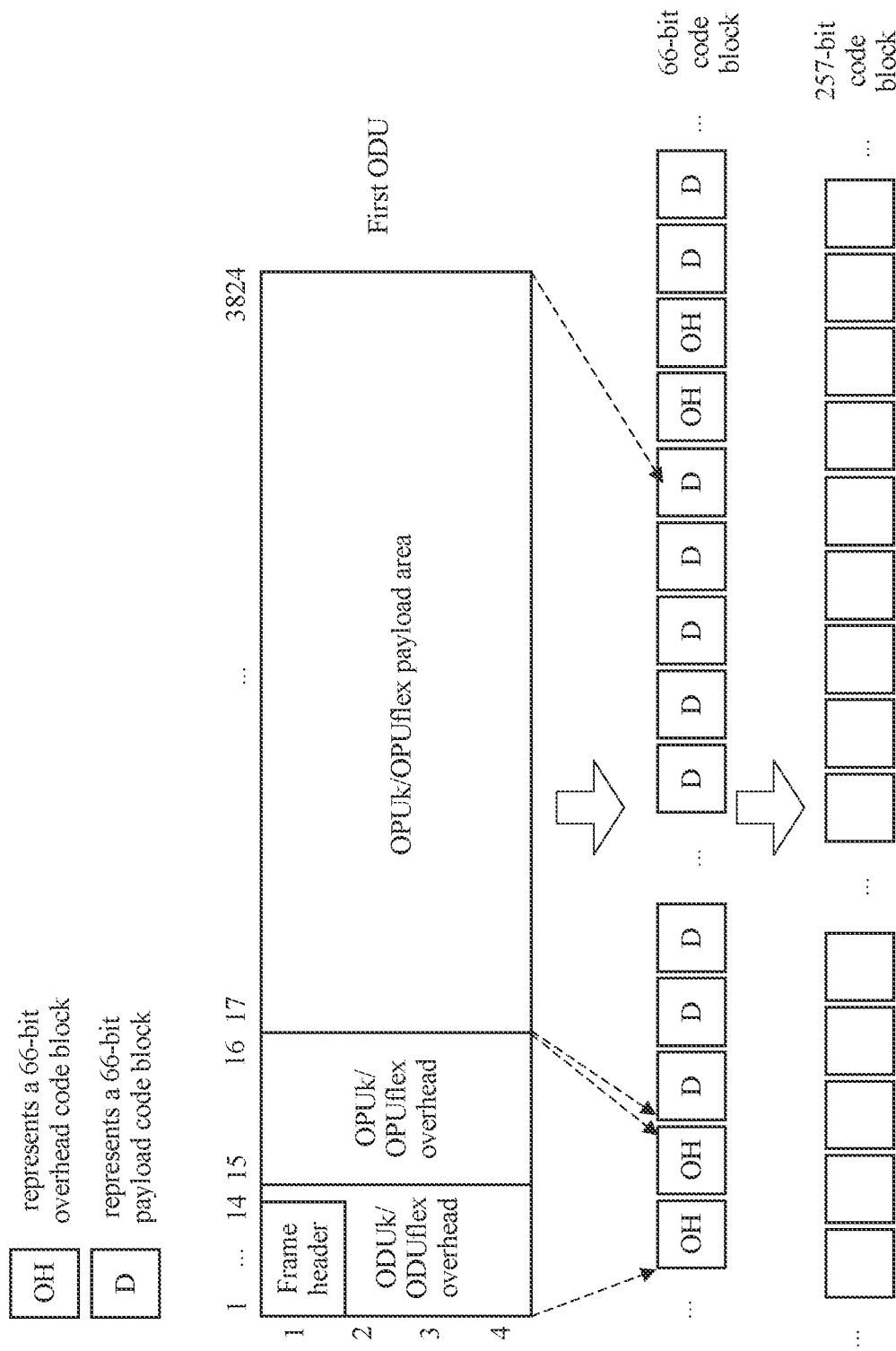
FIG. 6 is a schematic diagram of a frame structure of an ODU according to an embodiment of this application.

For another example, the frame structure of the second ODU is a consecutive 66-bit code block stream or a 257 b code block stream, where the code block stream includes an overhead code block and a payload code block, the overhead code block is obtained by performing compression encoding on an overhead area of the frame structure of the first ODU, and the payload code block is obtained by performing compression encoding on a payload area of the frame structure of the first ODU. FIG. 6 is a schematic diagram of a frame structure of an ODU according to an embodiment of this application. In the frame structure of the ODU shown in FIG. 6, the first ODU is a 4×3824 conventional structured module, including an overhead area and a payload area. The second ODU includes a plurality of consecutive 66-bit code block data streams. An overhead of each row in the first ODU is encoded into two 66-bit code blocks, and is located before the first 66-bit payload code block corresponding to each row of payload area.

Figure 7:
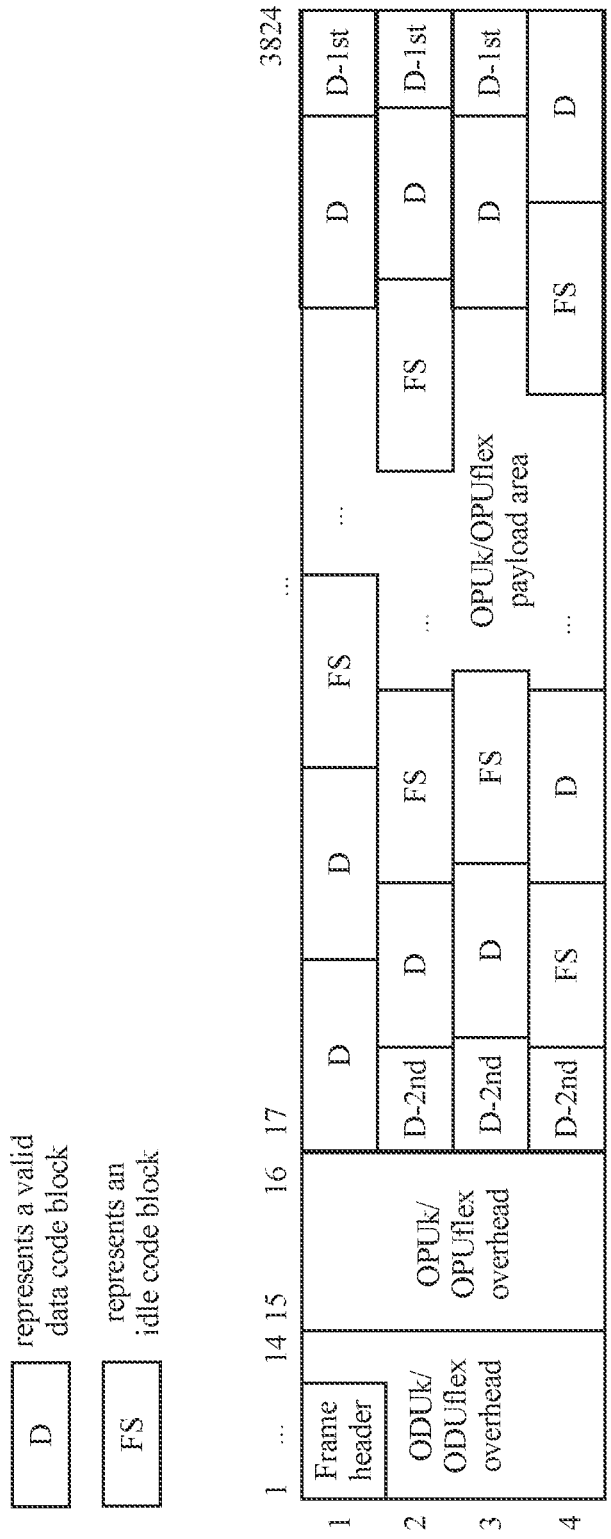
FIG. 7 is a schematic diagram of a frame structure of an ODU according to an embodiment of this application.

For another example, the frame structure of the second ODU may be obtained by deleting filling (Fixed Stuff, FS) information in a payload area of the first ODU. FIG. 7 is a schematic diagram of a frame structure of an ODU according to an embodiment of this application. It should be understood that FIG. 7 shows only the frame structure of the first ODU, and does not show the frame structure of the processed second ODU. In the frame structure of the ODU shown in FIG. 7, the first ODU is a 4×3824 conventional structured module, including an overhead area and a payload area. The payload area includes an idle code block (as an optional implementation of fixed stuff information) and a valid data code block. In the frame structure of the second ODU, all idle code blocks in the first ODU may be deleted, and two valid data code blocks adjacent to the idle code blocks are spliced into adjacent code blocks, so as to reduce a quantity of bits of data in a payload area of the second ODU, and reduce a bit rate of the ODU.

It should be noted that a valid data code block in the frame structure of the ODU may exist in a cross-row manner, to be specific, "D-1st" and "D-2nd" in FIG. 7 jointly form one valid data code block.

After the processing, an encoding mode of the first ODU is different from an encoding mode of the second ODU. For example, the first ODU uses a 64 b/66 b encoding mode, and the second ODU may be generated by performing 256 b/257 b compression encoding after the 64 b/66 b encoding mode.

The following describes in detail several possible implementations of processing the first ODU in this embodiment of this application.

Implementation 1, the processing may include performing compression encoding on the first ODU. That is, step 410 includes the following step: The network device performs compression encoding on the first ODU to obtain the second ODU.

The performing compression encoding on the first ODU may be understood as performing compression encoding on data in the payload area of the first ODU, or performing compression encoding on an overhead of the first ODU, or performing compression encoding on both data and an overhead in the payload area of the first ODU. This is not specifically limited in this embodiment of this application. When the data in the payload area of the first ODU and the overhead of the first ODU are being encoded, a same encoding mode may be used, or different encoding modes may be used.

In addition, when the encoding mode of the first ODU is 64 b/66 b, compression encoding may be 256 b/257 b encoding, in other words, four 66-bit code blocks are encoded into one 257-bit code block, so as to reduce a data volume of 7 bits. Certainly, other encoding modes may be used to perform compression encoding on the 66-bit code blocks. For example, eight 66-bit code blocks are encoded into a 513-bit code block in a 512 b/513 b encoding mode to further reduce the data volume. This is not limited in this embodiment of this application.

When the encoding mode of the first ODU is 8 b/10 b, compression encoding may be 64 b/66 b encoding, in other words, eight 10-bit code blocks are encoded into one 66-bit code block, so as to reduce a data volume of 14 bits. Certainly, four 66-bit code blocks may be further encoded into one 257-bit code block to reduce the data volume. This is not limited in this embodiment of this application.

When the encoding mode of the first ODU is 8 b/10 b, compression encoding may be alternatively 256 b/257 b encoding, in other words, 32 10-bit code blocks are encoded into one 257-bit code block, so as to reduce a data volume of 63 bits. Certainly, 64 10-bit code blocks can be encoded into one 513-bit code block to further reduce the data volume. This is not limited in this embodiment of this application.

It should be noted that the foregoing compression encoding may be compression encoding for one or more times, and this is not specifically limited in this embodiment of this application.

Figure 8:
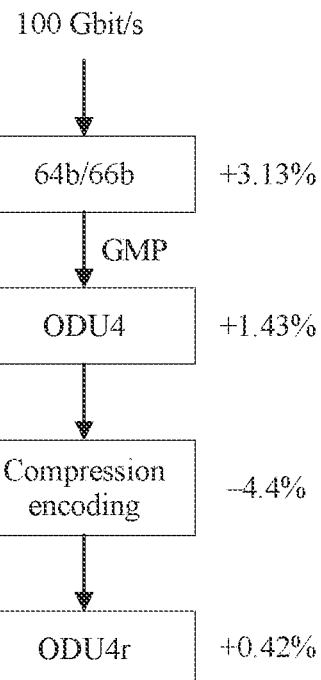
FIG. 8 is a schematic diagram of a bit rate increase in a process of encapsulating data into an ODU according to an embodiment of this application.

For example, the first ODU is an ODU4. The foregoing process of performing compression encoding on the data in the payload area is described with reference to FIG. 8. FIG. 8 is a schematic diagram of a bit rate increase in a process of encapsulating data into an ODU according to an embodiment of this application. A bit rate of to-be-carried service data is 100 Gbit/s, the service data is encoded by using 64 b/66 b encoding to generate a 66-bit code block, and this causes a bit rate increase of 3.13%. The data is mapped to the ODU4 through GMP, and this causes a bit rate increase of 1.43%. The network device can demap a 100 GE 66-bit code block data stream from the payload area of the ODU4. In this case, a bit rate of the 66-bit code block data stream is $$100 \times \left(\frac{66}{64}\right) = 103.125 \text{ Gbit/s},$$

and the 66-bit code block data stream is converted into a 257 b code block data stream by using 256 b/257 b encoding. Then the 257 b code block data stream is mapped to the second ODU (or referred to as "ODU4r") through Bit-synchronous Mapping Procedure (Bit-synchronous Mapping Procedure, BMP). A bit rate of the ODU4r is $$v_{ODU4r} = 100 \times \frac{257}{256} \times \frac{239}{238} = 100.812 \text{ Gbit/s},$$

where 100 represents a rate of to-be-transmitted data, $$\frac{257}{256}$$

represents a bit rate increase ratio when the 256 b/257 b encoding mode is used, and $$\frac{239}{238}$$

represents a ratio of a size of an ODU4r frame to a size of a payload area in the ODU4r. The bit rate of the ODU4r is reduced by approximately 4.0% relative to a standard bit rate 104.794 Gbit/s of the ODU4. Alternatively, before mapping the data in the first ODU to the ODU4r, the bit rate has been reduced by $$\frac{104.794 - 100.812 \times \left(\frac{238}{239}\right)}{100} = 4.4\%.$$

For example, the first ODU is the ODU4 and a plurality of lower-order ODUjs (j=0, 1, 2, 2e, 3) are multiplexed to the ODU4. Because the ODU4 is a bearer that satisfies 100 GE services, the standard bit rate of the ODU4 is defined as 104.794 Gbit/s, which has a 4.79% bit rate increase relative to 100 Gbit's bit rate. When multiplexing the plurality of low-order ODUjs, there is still rate redundancy. The network device can demap the plurality of ODUjs from a payload area of the ODU4, and the plurality of ODUjs are mapped and multiplexed to an ODU4r. A bit rate of the ODU4r is $$v_{ODU4r} = 100 \times \frac{257}{256} \times \frac{239}{238} = 100.812 \text{ Gbit/s},$$

where 100 represents a rate of to-be-transmitted data, 257/256 represents a bit rate increase ratio when a 256 b/257 b encoding mode is used, and $$\frac{239}{238}$$

represents a ratio of a size of an ODU4r frame to a size of a payload area in the ODU4r. The bit rate of the ODU4r is reduced by approximately 4.0% relative to the standard bit rate 104.794 Gbit/s of the ODU4.

For example, the first ODU is an ODUflex. A process of performing compression encoding on the data in the payload area is described. The network device demaps a 25 GE 66-bit code block data stream from a payload area of the ODUflex, converts the 66-bit code block data stream to a 257 b code block data stream by using 256 b/257 b encoding, and then maps the 257 b code block data stream to an ODUflexr through BMP. A bit rate of the ODUflexr is $$v_{ODUflexr} = 25 \times \frac{257}{256} \times \frac{239}{238} = 25.203 \text{ Gbit/s},$$

where 25 represents a rate of to-be-transmitted data, $$\frac{257}{256}$$

represents a bit rate increase ratio when 256 b/257 b encoding is used, and $$\frac{239}{238}$$

represents a ratio of a size of an ODUflexr frame to a size of a payload area in the ODUflexr. The bit rate of the ODUflexr is reduced by approximately $$\frac{25.890 - 25.203}{25} \times 100\% = 2.748\%$$

relative to the bit rate of the ODUflex $$v_{ODUflex} = 25 \times \frac{66}{64} \times \frac{239}{238} = 25.890 \text{ Gbit/s}.$$

For example, the first ODU is an ODUflex. The foregoing process of performing compression encoding on the overheads and the data in the payload area is described. The network device can convert a 16-byte overhead in each row of the ODUflex into two 66-bit overhead code blocks, to be specific, the network device uses the first eight bytes as 64-bit data, adds a 2-bit synchronization header 01, uses the last eight bytes as 64-bit data, and adds a 2-bit synchronization header 01. The network device then recovers a complete 66-bit code block data stream from a payload area of an ODUflex frame, and inserts the two 66-bit overhead code blocks before a current row in which the overhead of the two 66-bit code blocks is located and before a first 66-bit code block in the payload area corresponding to the current row.

The network device converts the 66-bit code block converted by the ODUflex into a 257b code block by using 256 b/257 b encoding, to obtain an ODUflexr that includes the 257 b code block data stream. A bit rate of the ODUflexr is $$v_{ODUflexr} = V \times \frac{z + \left(\frac{66}{64}\right) \times Z}{z} = \frac{4 \times 3803 + \left(\frac{66}{64}\right) \times 4 \times 16}{4 \times 3808},$$

where V represents a bit rate of the 257-bit code block data stream of a to-be-carried service, $$\frac{66}{64}$$

represents a bit rate increase ratio when a 64 b/66 b encoding mode is used, Z represents a size of the overhead in the ODUflexr, Z=4×16, z represents a size of the payload area in the ODUflexr, and z=4×3808.

For example, if the to-be-carried service data is 25 GE and has a bit rate of 25 Gbit/s, 64 b/66 b encoding is performed on the to-be-carried service data to obtain a 66-bit code block data stream with a bit rate of $$25 \times \frac{66}{64} = 25.78125 \text{ Gbit/s}.$$

Then after the 66-bit code block is mapped to the ODUflex through BMP, a bit rate of the ODUflex is $$v_{ODUflex} = 25 \text{ Gbit/s} \times \frac{66}{64} \times \frac{239}{238} = 25.890 \text{ Gbit/s},$$

where 25 Gbit/s represents the bit rate of to-be-transmitted service data, $$\frac{66}{64}$$

represents a bit rate increase ratio when 64 b/66 b encoding is used, and $$\frac{239}{238}$$

represents a ratio of a size of an ODUflex frame to a size of the payload area in the ODUflex. If the network device uses the 256 b/257 b encoding to perform compression encoding on the ODUflex to obtain the ODUflexr, a bit rate of the ODUflexr is $$v_{ODUflexr} = 25 \text{ Gbits/s} \times \frac{257}{256} \times \frac{z + \left(\frac{66}{64}\right) \times Z}{z} =$$

$$\frac{25 \text{ Gbit}}{s} \times \frac{257}{256} \times \frac{4 \times 3803 + \left(\frac{66}{64}\right) \times 4 \times 16}{4 \times 3808} = 25.206 \text{ Gbits/s},$$

where $$\frac{66}{64}$$

represents a bit rate increase ratio when the 64 b/66 b encoding mode is used, Z represents a size of the overhead in the ODUflexr, Z=4×16, z represents a size of the payload area in the ODUflexr, and z=4×3808. The bit rate is reduced by approximately $$\left(\frac{25.890}{25.206}\right) \Big/ 25 = 2.736\%$$

relative to $V_{ODUflex}$.

For another example, when the to-be-carried service is a common public radio interface (Common Public Radio Interface, CPRI) service, the service data is usually a 10-bit code block data stream. To be specific, the network device demaps a 10 b code block data stream from the payload area of the ODUflex, and converts the 10-bit code block data stream into a 66-bit code block data stream by using the 64 b/66 b encoding. In other words, the network device encodes eight 10-bit code blocks into one 66-bit code block to reduce a data volume of 14 bits, and finally maps the 66-bit code block data stream to the ODUflexr through BMP, and a bit rate of the ODUflexr is lower than a bit rate of the ODUflex.

Implementation 2, the foregoing processing may include deleting fixed stuff information in the first ODU. That is, step 410 includes the following step: The network device deletes at least a part of fixed stuff information in the first ODU to obtain the second ODU.

The fixed stuff information may be redundant information that is added to the first ODU for a reason such as rate adaptation, for example, may be fixed stuff information generated by mapping the service data into the first ODU through Generic Mapping Procedure (Generic Mapping Procedure, GMP) or Idle Mapping Procedure (Idle Mapping Procedure, IMP). The fixed stuff information may be embodied in all zeroes or in an idle (IDLE) code block.

If the first ODU is a current frame, the network device may determine a mapping pattern of the payload area of the first ODU by using GMP mapping overhead information (for example, Cm information) carried in a previous frame of the current frame. The mapping pattern indicates distribution of the fixed stuff information in the payload area of the first ODU. In this case, the network device can delete at least a part of fixed stuff information in the first ODU based on the mapping pattern of the payload area of the first ODU.

In addition, it should be noted that if an encapsulation node device of the first ODU and the network device are a same node, the node may directly obtain the mapping pattern of the payload area of the first ODU and delete the fixed stuff information in the payload area of the first ODU.

Implementation 3, the foregoing processing may include deleting an unused timeslot in the first ODU. That is, step 410 includes the following step: The network device deletes an unused timeslot in the first ODU to obtain the second ODU.

When an ODU carries service data for a plurality of services, the ODU has an unused timeslot. In this case, the network device can delete the unused timeslot in the first ODU to reduce the bit rate.

For example, when the first ODU is an ODU4, the ODU4 is divided into 80 timeslots, and each row in the ODU4 frame can carry a data volume of 3824 bytes. However, currently each row in the ODU4 frame includes 16-byte overheads, service data is carried only in T 1.25 G timeslots, and data volume correspondingly carried by each 1.25 G timeslot in each row of the ODU4 frame is 191 bytes. After deleting the unused timeslots in the first ODU, the network device obtains the second ODU, which is also referred to as "ODU4r". A bit rate of the ODU4r is $$v_{ODU4r} = \frac{16 + 191T}{3824} \times v_{ODU4},$$

where $v_{ODU4}$ represents a standard bit rate of the ODU4.

The foregoing three implementations can be used separately or in combination. This is not specifically limited in this embodiment of this application. For example, implementation 1 may be combined with implementation 2, or implementation 1 may be combined with implementation 3.

420. The network device sends the second ODU.

The network device may send the second ODU in the following process: The network device first maps the second ODU to the OTU and then maps the OTU to m FlexO interfaces in a conventional OTN network mapping process.

Optionally, step 420 includes the following step: The network device maps the second ODU to a third ODU, where a bit rate of the third ODU is any one of n×25 G, n×50 G, and n×100 G, and n is a positive integer; and the network device sends the third ODU through m FlexO interfaces, where a bit rate of each of the FlexO interfaces is any one of 25 G, 50 G, 100 G, 200 G, and 400 G, and m is a positive integer.

It should be noted that, a relationship between the parameter m of the m FlexO interfaces and the parameter n that indicates the bit rate of the third ODU is not limited. Herein, n may be less than m, for example, n=1 and m=4, and it may indicate that the third ODU of the 1×100 G bit rate is sent through four FlexO interfaces of the 25 G bit rate. Alternatively, n is equal to m, for example, n=4 and m=4, and it may indicate that the third ODU of the bit rate of 4×100 G is sent through four FlexO interfaces of the 100 G bit rate. Alternatively, n is greater than m, for example, n=4 and m=2, and it may indicate that the third ODU of the 4×100 G bit rate is sent through two FlexO interfaces of the 200 G bit rate.

A size of the second ODU obtained by processing may vary, and the network device may determine the size of the second ODU based on an FAS carried in the second ODU. The size of the second ODU may be fixed. Specifically, the network device may determine the size of the second ODU based on a service type to which the to-be-carried data belongs.

To be specific, the method further includes the following step: The network device determines, based on a service type to which data carried in the first ODU belongs, a maximum data volume of data carried in the second ODU. Step 420 includes the following step: The network device processes the first ODU to obtain the second ODU, where a data volume of data carried in the second ODU is the maximum data volume.

For example, the first ODU is an ODU4, the second ODU is an ODU4r, a data volume of service data carried in the ODU4 is represented by N, overheads carried in the ODU4r frame occupy 64 bytes, and a maximum data volume of data that can be carried in the ODU4r frame is represented by M. When N is less than M, M−N pieces of fixed stuff information may be added to a payload area of the ODU4r frame, so that the size of the second ODU is a fixed value.

An embodiment of this application further provides a data transmission method to reduce a bit rate of a second ODU by optimizing a mapping manner of the second ODU in an OTN. It should be noted that the second ODU in this case may be the previously mentioned second ODU that is obtained by processing the first ODU. Alternatively, the second ODU may be the first ODU above, in other words, an unprocessed ODU.

Figure 9:
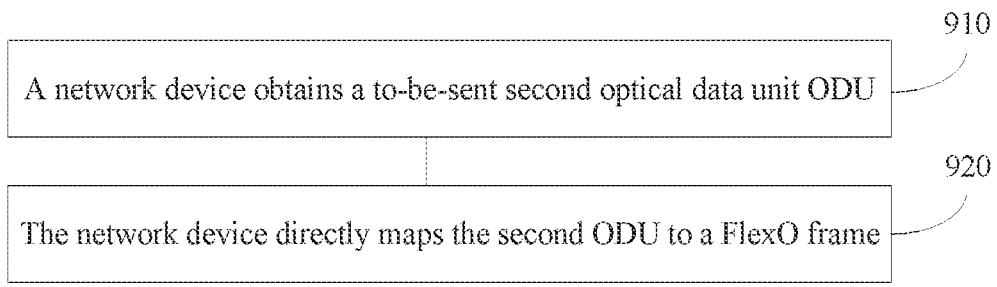
FIG. 9 is a schematic flowchart of a data transmission method according to another embodiment of this application.

FIG. 9 is a schematic flowchart of a data transmission method according to another embodiment of this application. The method shown in FIG. 9 may be performed by a network device, and the network device may be any OTN device in FIG. 1 that sends data. Specifically, the network device may be a source node or an intermediate node.

910. The network device obtains a to-be-sent second optical data unit ODU.

920. The network device directly maps the second ODU to a FlexO frame. Alternatively, the network device directly maps the second ODU to m FlexO interfaces, where m is a positive integer.

In this embodiment of this application, the second ODU is directly mapped to the FlexO frame, so that an increase of new OTU layer overheads because the second ODU is mapped to an OTU in a conventional OTN network can be avoided, so as to reduce a bit rate of the second ODU.

Optionally, the bit rate of each FlexO interface is 25 G, 50G, 100G, 200G, or 400G. In this case, the FlexO frame includes section monitoring (Section Monitoring, SM) overheads at an OTU level, and the SM may be located in reserved bytes in a FlexO frame overhead area. This is not limited in this application.

It should be noted that, when the second ODU in the method shown in FIG. 9 is the second ODU in the method shown in FIG. 4, it may be understood that the method shown in FIG. 9 and the method shown in FIG. 4 may be combined, to be specific, both the encapsulation manner and the mapping manner of the second ODU are optimized to reduce a bit rate of the second ODU.

Figure 10:
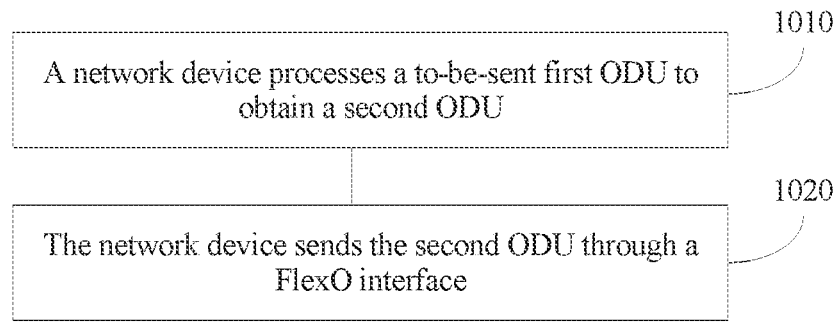
FIG. 10 is a schematic flowchart of a data transmission method according to another embodiment of this application.

FIG. 10 is a schematic flowchart of a data transmission method according to another embodiment of this application. The method includes the following steps.

1010. A network device processes a to-be-sent first ODU to obtain a second ODU, where a bit rate of the second ODU is lower than a bit rate of the first ODU.

1020. The network device sends the second ODU through a FlexO interface.

The implementation of step 1010 is basically the same as that of step 410, the implementation of step 1020 is basically the same as that of step 920, and details are not described herein again.

Figure 11:
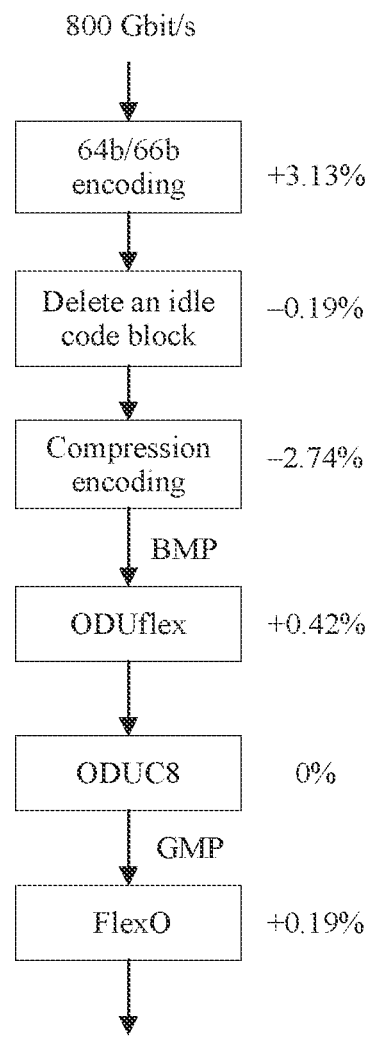
FIG. 11 is a schematic diagram of a bit rate increase in a process of transmitting service data according to an embodiment of this application.

FIG. 11 is a schematic diagram of a bit rate increase in a process of transmitting service data according to an embodiment of this application. A bit rate of service data carried in a first ODU is 800 Gbit/s. A network device uses 64 b/66 b encoding to encode to-be-carried service data to generate a 66-bit code block, and this causes a bit rate increase of 3.13%.

Deleting an idle code block by the network device causes a 0.19% reduction of the bit rate increase. The network device deletes 20 idle code blocks every 10240 66-bit code blocks.

The network device uses the 256 b/257 b encoding to encode the 66-bit code block in ODUflex to generate a 257-bit code block. In this case, the bit rate increase reduced by using compression encoding is $$\frac{\left(800 \times \frac{66}{64} - 800 \times \frac{257}{256}\right)}{800} \times 100\% = 2.74\%.$$

The network device then maps the 257-bit code block to the ODUflex directly through BMP, and this causes a bit rate increase of 0.42%.

The network device maps the ODUflex to an ODUC8. Because the ODUflex originally has an ODU overhead, no additional ODU layer overhead is required. Therefore, the rate increase is 0.

The network device directly maps the ODUflex to the FlexO interface through GMP. Because an overhead of encapsulating the FlexO frame is required, a bit rate increase of 0,19% is caused.

In conclusion, a bit rate increase is approximately 0.81% in the data transmission process in which implementation 1 and implementation 2 are combined with the method shown in FIG. 5, and a conventional data transmission solution usually causes a 5% bit rate increase. Therefore, the data transmission process in this embodiment of this application greatly reduces a bit rate increase. It should be noted that the rate increase brought by the data transmission technology provided in this embodiment of this application is comparable to a rate increase brought by the Ethernet technology, with an advantage that an OTN device using the technology can use a same optical module as that used by an Ethernet device, so that the same optical module is configured for different devices, and this helps reduce costs of the optical module and costs of the OTN device.

If the data transmission method shown in FIG. 4 to FIG. 11 is applied to an OTN, some OTN devices in the OTN probably cannot identify a second ODU obtained after processing. In this case, an OTN device that can identify the second ODU needs to process the second ODU and restore the first ODU, so that an OTN device that cannot process the second ODU can process the first ODU. This is described below with reference to FIG. 12.

Figure 12:
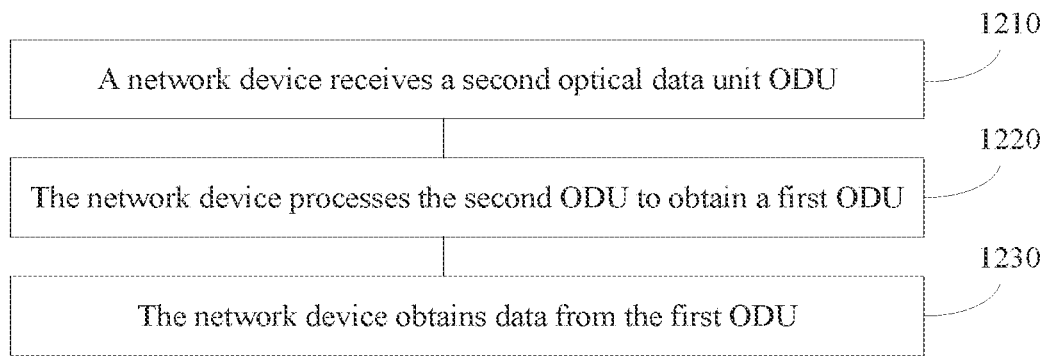
FIG. 12 is a schematic flowchart of a data transmission method according to an embodiment of this application.

FIG. 12 is a schematic flowchart of a data transmission method according to an embodiment of this application. FIG. 12 can be performed by any OTN device other than the source end and the destination end in the OTN shown in FIG. 1. It should be noted that the same name, as that used above, in the solution described in FIG. 12 may be understood as a same thing or a same processing manner. For brevity, refer to the foregoing description. Details are not described herein again. The method includes the following steps.

1210. A network device receives a second optical data unit ODU.

1220. The network device processes the second ODU to obtain a first ODU, where a bit rate of the second ODU is lower than a bit rate of the first ODU.

Processing the second ODU may be understood as an inverse processing process of processing the first ODU above. In other words, when processing the first ODU includes compression encoding, processing the second ODU may be a decoding process corresponding to the compression encoding. When processing the first ODU includes deleting fixed stuff information, processing the second ODU may include adding fixed stuff information. When processing the first ODU includes deleting an unused timeslot, processing the second ODU is adding a timeslot.

The following specifically describes several possible implementations of processing the second ODU in this embodiment of this application.

Implementation 1: The network device decodes the second ODU to obtain the first ODU.

For example, the network device may demap service data from a payload area of the second ODU. When the service data is a 257-bit code block data stream, the network device decodes the 257-bit code block data stream, restores a 66-bit code block data stream, and then maps the 66-bit code block data stream to the first ODU.

For another example, the network device directly decodes the second ODU. When service data carried in the second ODU is a 257-bit code block data stream, the network device decodes the 257-bit code block data stream into a 66-bit code block data stream, then identifies two consecutive 66-bit overhead code blocks, deletes synchronization headers of the two 66-bit overhead code blocks, converts the two 66-bit overhead code blocks into 16-byte ODU overheads, and moves the 16-byte ODU overheads to an overhead location, to be specific, 3824 bytes in each line of an ODU frame contain 16-byte overheads, to obtain the first ODU.

Certainly, if the data in the payload area of the second ODU and the overhead of the second ODU are obtained in different encoding modes, the network device may decode the data in the payload area of the second ODU and the overhead of the second ODU in different decoding manners in the decoding process.

Implementation 2: The network device fills the second ODU with fixed stuff information to obtain the first ODU.

For the IMP mapping manner, the network device may perform, based on a rate difference between the bit rate of the second ODU and the bit rate of the first ODU, rate adaptation by filling the payload area of the second ODU with an idle code block, and restore the bit rate of the first ODU, to obtain the first ODU.

For the GMP mapping, the network device may learn of, based on mapping information carried in the second ODU, for example, a Cm value, a mapping pattern (in the first ODU) of valid data carried in the second ODU, so that the network device inserts the deleted fixed stuff information into the second ODU again to obtain the first ODU.

Implementation 3: The network device fills the second ODU with a timeslot to obtain the first ODU.

Specifically, the network device may obtain an overhead indicating a multiplexing structure carried in the second ODU, and determine original timeslot distribution and occupation of the first ODU by using the overhead. The network device may add an unused timeslot to the second ODU based on the overhead, to obtain the first ODU.

1230. The network device obtains data from the first ODU.

Optionally, the method further includes the following step: The network device determines a service type to which data carried in the second ODU belongs; and the network device determines a size of the second ODU frame based on the service type to which the data belongs.

The foregoing describes in detail the data transmission method in the embodiments of this application with reference to FIG. 1 to FIG. 12. The following describes in detail an apparatus in the embodiments of this application with reference to FIG. 13 to FIG. 15. It should be understood that the apparatus shown in FIG. 13 to FIG. 15 can implement one or more steps in FIG. 4, FIG. 9, FIG. 10, or FIG. 12. To avoid repetition, details are not described herein again.

Figure 13:
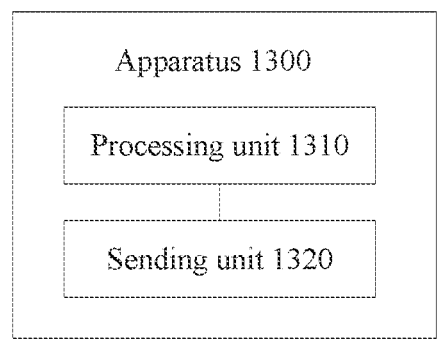
FIG. 13 is a schematic diagram of a data transmission apparatus according to an embodiment of this application.

FIG. 13 is a schematic diagram of a data transmission apparatus according to an embodiment of this application.

An apparatus 1300 shown in FIG. 13 includes a processing unit 1310 and a sending unit 1320. In a possible implementation, the apparatus 1300 may be configured to perform the method shown in FIG. 4, to be specific, the processing unit 1310 performs step 410, and the sending unit 1320 performs step 420. In another possible implementation, the apparatus 1300 may be configured to perform the method shown in FIG. 9, to be specific, the processing unit 1310 performs step 910, and the sending unit 1320 performs step 920. In still another possible implementation, the apparatus 1300 may be configured to perform the method shown in FIG. 10, to be specific, the processing unit 1310 performs step 1010, and the sending unit 1320 performs step 1020. It should be noted that, the processing unit 1310 may be further configured to perform steps other than sending and receiving in the method embodiments in the foregoing figures. For details, refer to related descriptions in the foregoing method embodiments. Details are not described herein.

Figure 14:
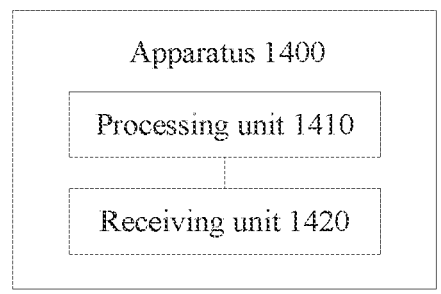
FIG. 14 is a schematic diagram of a data transmission apparatus according to an embodiment of this application.

FIG. 14 is a schematic diagram of a data transmission apparatus according to an embodiment of this application. An apparatus 1400 shown in FIG. 14 includes a processing unit 1410 and a receiving unit 1420. The apparatus 1400 may be configured to perform the method shown in FIG. 12. For example, the processing unit 1410 may perform step 1220 and step 1230, and the receiving unit 1420 may perform step 1210. It should be noted that, the processing unit 1410 may be further configured to perform steps other than sending and receiving in the method embodiment in the foregoing figure. For details, refer to related descriptions in the foregoing method embodiment. Details are not described herein.

Figure 15:
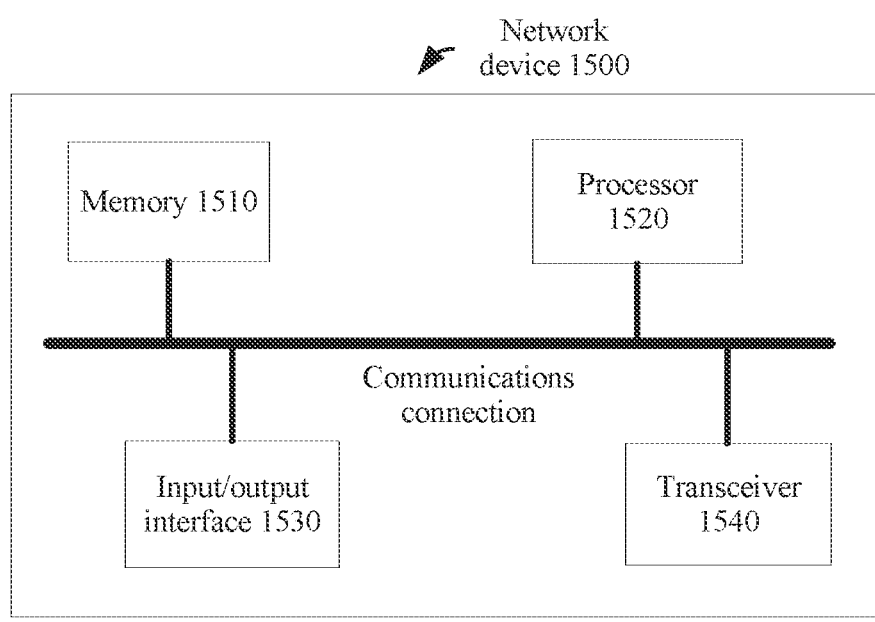
FIG. 15 is a schematic structural diagram of a network device according to an embodiment of this application.

FIG. 15 is a schematic structural diagram of a network device according to an embodiment of this application. A network device 1500 shown in FIG. 15 may include a memory 1510, a processor 1520, an input/output interface 1530, and a transceiver 1540. The memory 1510, the processor 1520, the input/output interface 1530, and the transceiver 1540 are connected to each other by using an internal connection path. The memory 1510 is configured to store an instruction. The processor 1520 is configured to execute the instruction stored in the memory 1520, so as to control the input/output interface 1530 to receive input data and information and output data such as an operation result, and control the transceiver 1540 to send a signal. Specifically, the processor 1520 may be configured to perform an operation of the processing unit 1310 in FIG. 13, or perform an operation of the processing unit 1410 in FIG. 14. Likewise, the transceiver 1540 may be configured to perform a sending operation of the sending unit 1320 in FIG. 13, or perform an operation of the receiving unit 1420 FIG. 14. It should be noted that, the processor 1520 is configured to perform an operation for a data frame in the foregoing method embodiments, and the transceiver 1540 is configured to perform one or more operations of sending and receiving in the foregoing method embodiments. For details, refer to related descriptions in the foregoing method embodiments. Details are not described herein.

It should be understood that, the processor 1520 may use a general central processing unit (Central Processing Unit, CPU), a microprocessor, an application specific integrated circuit (Application Specific Integrated Circuit, ASIC), or one or more integrated circuits, and is configured to execute a related program, so as to implement the technical solutions provided in the embodiments of this application.

It should be also understood that, the transceiver is also referred to as a communications interface, and uses a transceiver apparatus that may be but is not limited to a transceiver, so as to implement communication between the network device and another device or communications network. The memory may include a read-only memory and a random access memory, and provide an instruction and data to the processor. A part of the processor may further include a non-volatile random access memory. For example, the processor may further store information of a device type.

In an implementation process, steps in the foregoing methods can be implemented by using a hardware integrated logical circuit in the processor, or by using instructions in a form of software. The method of the communication disclosed with reference to the embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor. To avoid repetition, details are not described herein again.

It should be understood that, the processor in the embodiments of this application may be a CPU, or may be another general-purpose processor, a digital signal processor (digital signal processor, DSP), an application-specific integrated circuit (application specific integrated circuit, ASIC), a field programmable gate array (field-programmable gate array, FPGA) or another programmable logical device, discrete gate or transistor logical device, discrete hardware component, or the like. The general-purpose processor may be a microprocessor, or the processor may be any conventional processor or the like.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, comprising:
   obtaining, by a network device, a mapping pattern of a payload area of a first optical data unit (ODU);
   processing, by a network device, a first optical data unit (ODU) to obtain a second ODU, wherein a bit rate of the second ODU is lower than a bit rate of the first ODU, and wherein processing the first ODU comprises:
   deleting, based on the mapping pattern, a least a portion of fixed stuff information in the first ODU, wherein the second ODU comprises two valid data code blocks, and wherein the two valid data code blocks are adjacent to the portion of fixed stuff information and are spliced into adjacent code blocks; and
   sending, by the network device, the second ODU.

2. The method according to claim 1, wherein a frame structure or an encoding mode of the first ODU is different from the second ODU.

3. The method according to claim 1, wherein the processing the first ODU comprises: performing, by the network device, compression encoding on the first ODU to obtain the second ODU.

4. The method according to claim 3, wherein the performing the compression encoding on the first ODU comprises: performing, by the network device, compression encoding on data in a payload area of the first ODU to obtain the second ODU.

5. The method according to claim 3, wherein the performing the compression encoding on the first ODU comprises: performing, by the network device, compression encoding on an overhead in the first ODU to obtain the second ODU.

6. The method according to claim 1, wherein the fixed stuff information is an idle code block.

7. The method according to claim 1, wherein the processing the first optical data unit ODU comprises: deleting, by the network device, an unused timeslot in the first ODU to obtain the second ODU.

8. The method according to claim 1, wherein the sending the second ODU comprises:
   mapping, by the network device, the second ODU to a third ODU, wherein a bit rate of the third ODU is one of n×25 Gigabit per second (G), n×50G, or n×100G, and n is a positive integer; and
   sending, by the network device, the third ODU through m flexible optical transport network (FlexO) interfaces, wherein m is a positive integer, and a bit rate of each FlexO interface is one of 25G, 50G, 100G, 200G, or 400G.

9. The method according to claim 1, wherein the sending the second ODU comprises: mapping, by the network device, the second ODU to a flexible optical transport network (FlexO) frame.

10. The method according to claim 9, wherein a bit rate of each of m FlexO interfaces through which a FlexO frame is transmitted is one of 25 Gigabit per second (G), 50G, 100G, 200G, or 400G, and m is a positive integer.

11. A network device, comprising:
    at least one processor; and
    a memory coupled to the at least one processor and storing programming instructions for execution by the at least one processor, the programming instructions instructing the at least one processor to:
    obtain a mapping pattern of a payload area of a first optical data unit (ODU);
    process a first optical data unit (ODU) to obtain a second ODU, wherein a bit rate of the second ODU is lower than a bit rate of the first ODU, and wherein processing the first ODU comprises:
    deleting, based on the mapping pattern, a least a portion of fixed stuff information in the first ODU, wherein the second ODU comprises two valid data code blocks, and wherein the two valid data code blocks are adjacent to the portion of fixed stuff information and are spliced into adjacent code blocks; and
    send the second ODU.

12. The device according to claim 11, wherein a frame structure or an encoding mode of the first ODU is different from the second ODU.

13. The device according to claim 11, wherein the programming instructions further instructing the at least one processor to perform compression encoding on the first ODU to obtain the second ODU.

14. The device according to claim 13, wherein the programming instructions further instructing the at least one processor to perform compression encoding on data in a payload area of the first ODU to obtain the second ODU.

15. A network device, comprising:
    at least one processor; and
    a memory coupled to the at least one processor and storing programming instructions for execution by the at least one processor, the programming instructions instructing the at least one processor to:
    receive a second optical data unit (ODU);
    add fixed stuff information to the second ODU to obtain a first ODU, wherein a bit rate of the second ODU is lower than a bit rate of the first ODU, wherein the fixed stuff information correspond to a mapping pattern of a payload area of the first ODU, wherein the second ODU comprises two valid data code blocks, and wherein the two valid data code blocks are adjacent to a portion of fixed stuff information and are spliced into adjacent code blocks; and obtain data from the first ODU.

16. The device according to claim 15, wherein a frame structure or an encoding mode of the first ODU is different from the second ODU.

17. The device according to claim 15, wherein the programming instructions further instructing the at least one processor to decode the second ODU to obtain the first ODU.

18. The device according to claim 17, wherein the programming instructions further instructing the at least one processor to perform decoding on data in a payload area of the second ODU to obtain the first ODU.

\* \* \* \* \*

UNITED STATES PATENT AND TRADEMARK OFFICE
CERTIFICATE OF CORRECTION

PATENT NO. : 11,438,069 B2
APPLICATION NO. : 17/103180
DATED : September 6, 2022
INVENTOR(S) : Wei Su, Qiuyou Wu and Huaping Qing It is certified that error appears in the above-identified patent and that said Letters Patent is hereby corrected as shown below:

In the Claims

In Column 21, Line 47, In Claim 1, delete "a" and insert -- at --.

In Column 22, Line 6, In Claim 7, delete "ODU" and insert -- (ODU) --.

In Column 22, Line 40, In Claim 11, delete "a" and insert -- at --.

Signed and Sealed this
Twentieth Day of December, 2022

Katherine Kelly Vidal
*Director of the United States Patent and Trademark Office*